No. 799,433. PATENTED SEPT. 12, 1905.
C. BAJOHR.
SUPPORT FASTENER FOR LIGHTNING CONDUCTORS.
APPLICATION FILED MAR. 29, 1905.
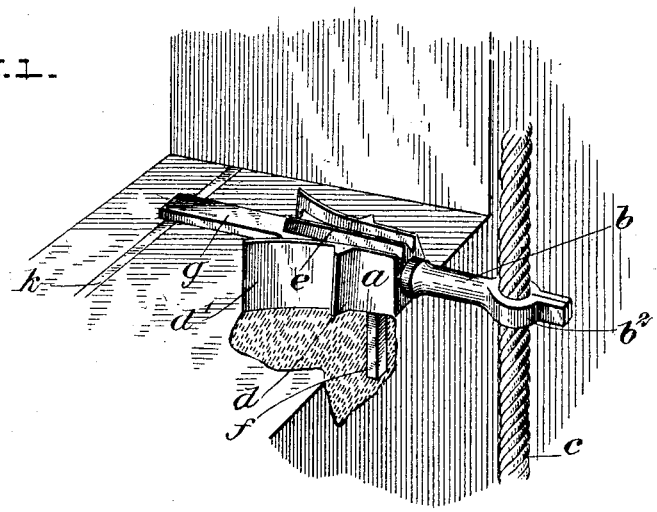
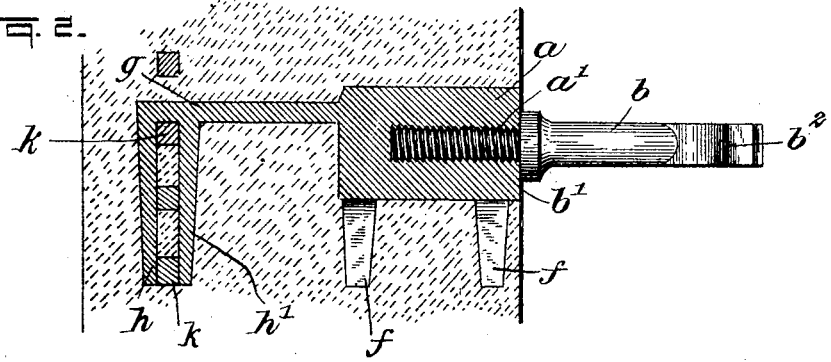
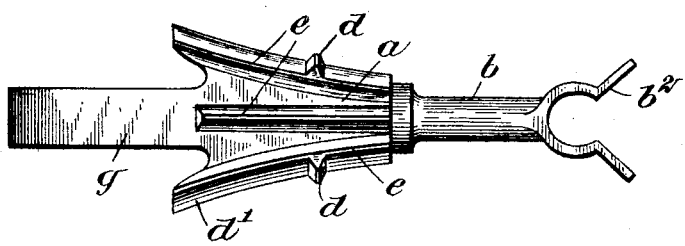
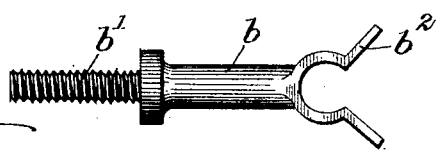
WITNESSES:
INVENTOR
Carl Bajohr
BY
ATTORNEYS

UNITED STATES PATENT OFFICE.

CARL BAJOHR, OF ST. LOUIS, MISSOURI.

SUPPORT-FASTENER FOR LIGHTNING-CONDUCTORS.

No. 799,433.　　　　　Specification of Letters Patent.　　　　　Patented Sept. 12, 1905.

Application filed March 29, 1905. Serial No. 252,654.

*To all whom it may concern:*

Be it known that I, CARL BAJOHR, a citizen of the United States, and a resident of St. Louis, in the State of Missouri, have invented a new and Improved Support-Fastener for Lightning-Conductors, of which the following is a full, clear, and exact description.

Anchor fastening devices for lightning-rods and kindred purposes have been designed for use on walls built of brick and stone; but those walls which are made of plastic material molded in the place in which they are to be used at present have to be drilled or broken in order to place lightning-conductor fasteners or supports, and the hole made in this process weakens the structure besides seriously affecting its appearance, because it cannot be repaired in such a manner as to make the wall in all respects like the original piece of artificial stone or concrete molded in one block.

The principal object of the present invention is to provide a fastener for use on walls of this kind which can be applied to chimneys, partitions, and walls of all characters made of these and similar materials.

Reference is to be had to the accompanying drawings, forming a part of this specification, in which similar characters of reference indicate corresponding parts in all the figures.

Figure 1 is a perspective view of a portion of a wall, showing a support-fastener constructed in accordance with the principle of my invention applied thereto. Fig. 2 is a vertical sectional view of the same support-fastener. Fig. 3 is a plan of a support-fastener such as that shown in the other figures, and Fig. 4 is a plan of a detachable portion of the device.

The support-fastener in its preferred form comprises two parts, a body $a$ and a guide-piece $b$. The body is provided with a cavity $a'$ and the guide-piece with a screw $b'$. These parts fit each other so that the guide-piece can be secured to the body and tightened after the body is placed in the wall. The guide-piece is, as usual, provided with arms $b^2$ for receiving the lightning-conductor.

The body $a$ is provided with lateral ribs $d$ and gradually-diverging projections $d'$, extending to the rear, and the outer walls of these as well as the other outer walls of the body taper from the bottom to the top to prevent displacement while the cement is poured in the molds. The top of the body is provided with projections $e$. The purpose of the ribs $d$ and projections $d'$ and $e$ is to afford intimate contact with the plastic material in which the anchor is to be embedded, so as to securely fix the fastener in place. From the lower surface of the body extend a plurality of feet $f$. These also provide for holding the plastic material, and, moreover, they afford a rest upon which the body may be placed in the bottom of the mold, either after a part of the plastic material is poured in or before, so that upon the introduction of the main body of plastic material the latter will flow between the feet and all around the body, so as to securely hold it in position when the plastic material sets. From the rear of the body extends a projection $g$, and this is provided with a pair of downwardly-extending flanges $h$ and $h'$, operating to assist in holding the body in place. When the fastener is to be placed in a wall in the course of construction of the latter, the body is placed at the bottom of the mold, with the feet and flanges resting directly upon the top of the block below or the bottom of the mold. This is done either after a part of the plastic material is poured in or before, and the flanges $h$ and $h'$ are usually placed in contact with a reinforced steel construction $k$, which consists of steel beams, rings, or girders, which is in general embedded in the cement or concrete structures for strengthening. This connection is to be done from the scientific standpoint for the purpose of avoiding damage from induction by lightning-flashes, or, in other words, so that if said structure is struck by lightning it will prevent the possibility of a lateral discharge which may take place between detached masses of metals or between the metal reinforcement and the lightning-conductor. The mold is then filled with plastic material, and when it (the plastic material) sets the body is a permanent part of the wall. It is understood, of course, that the guide-piece $b$ is absent when the wall is built in this manner and that the front face of the body is flush with the front face of the wall because it rests against the front of the mold in which the wall is made. The projection $g$ may be short or long to fit metal contacts of different dimensions, so as to be entirely embedded within the wall, as shown in Fig. 2. This will depend upon the thickness of the wall and the location of the strengthening steel reinforcement $k$.

The construction of the device is such that it will be securely held in position in the wall and that the guide-pieces can be readily applied to it, as desired, after the wall is constructed. Furthermore, the device will not disfigure the wall, and it is inexpensive, the body being formed of a single casting, preferably of bronze. It should be formed of some material capable of resisting the action of the elements.

In operation the lightning-conductors act as usual; but on account of the contact between the metallic body of the support-fastener and the metallic strengthening-bar of the wall the lightning may be dissipated throughout the metallic framework of the building, and thus add to the safety of the protecting system.

Having thus described my invention, I claim as new and desire to secure by Letters Patent—

1. A support-fastener for lightning-conductors, having a foot extending from its lower surface, and projections extending outwardly from the body thereof to assist in holding the anchor in position in a wall.

2. A support-fastener for lightning-conductors, having a plurality of feet extending from its lower surface, and projections extending rearwardly and outwardly from the body thereof.

3. A support-fastener for lightning-conductors, having a plurality of feet extending from its lower surface, projections extending rearwardly and outwardly from the body thereof, a projection extending from the rear of the body of the fastener, and a flange on the rear end of the projection.

4. A support-fastener for lightning-conductors, having projections upon the body thereof for assisting in securing it to the material of a wall, a projection extending from the rear end of the body, and a flange upon said projection adapted to engage a metallic part of the wall.

5. The combination with a wall composed in the main of plastic material and having metallic frames or strengthening-bars embedded therein, of a fastener for lightning-conductors embedded in the wall and having a front face flush with the front face of the wall, said fastener being provided with means for receiving and holding a guide-piece for the lightning-conductor.

6. The combination with a wall composed in the main of plastic material and having metallic strengthening elements embedded therein, of a support-fastener for lightning-conductors provided with projections for securing it to the plastic material of the wall and having a front face flush with the front surface of the wall, said fastener being provided with a rearwardly-extending projection having a flange engaging said strengthening elements and forming an electrical connection therewith, and a removable guide-piece adapted to be secured to the front of the fastener.

In testimony whereof I have signed my name to this specification in the presence of two subscribing witnesses.

CARL BAJOHR.

Witnesses:
   JNO. M. RITTER,
   ALBERT E. FAY.